(12) United States Patent
Chen

(10) Patent No.: US 10,970,522 B2
(45) Date of Patent: Apr. 6, 2021

(54) DATA PROCESSING METHOD, ELECTRONIC DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Deyin Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 151 days.

(21) Appl. No.: 16/237,789

(22) Filed: Jan. 2, 2019

(65) Prior Publication Data
US 2019/0220651 A1 Jul. 18, 2019

(30) Foreign Application Priority Data

Jan. 12, 2018 (CN) .......................... 201810032305.9

(51) Int. Cl.
*G06K 9/00* (2006.01)
*H04N 1/00* (2006.01)
(Continued)

(52) U.S. Cl.
CPC ......... *G06K 9/00228* (2013.01); *G06F 16/27* (2019.01); *G06F 16/275* (2019.01);
(Continued)

(58) Field of Classification Search
CPC .. C07G 17/008; C10M 159/22; G06F 16/182; G06F 16/27; G06F 16/275;
(Continued)

(56) References Cited

U.S. PATENT DOCUMENTS

2003/0068087 A1* 4/2003 Wu ...................... G06F 16/739
382/190
2005/0102328 A1 5/2005 Ring et al.
(Continued)

FOREIGN PATENT DOCUMENTS

CN 101217431 7/2008
CN 104317932 1/2015
(Continued)

OTHER PUBLICATIONS

Apple Support, "Set up and use iCloud Photos," 2020, 8 pages.
(Continued)

*Primary Examiner* — Bobbak Safaipour
(74) *Attorney, Agent, or Firm* — Hodgson Russ LLP

(57) ABSTRACT

The present disclosure provides a data processing method, an electronic device and a computer-readable storage medium. The method includes: acquiring first image data of images stored in a local device and second image data of images stored in another device; comparing the first image data with the second image data to determine a storage type of an image contained in the first image data and/or contained in the second image data; establishing a mapping relation between a first face group contained in the first image data and a second face group contained in the second image data according to the storage type; and processing the first image data and the second image data for the first face group and the second face group having the mapping relation with each other.

18 Claims, 4 Drawing Sheets

(51) Int. Cl.
*G06F 16/27* (2019.01)
*G06F 16/182* (2019.01)

(52) U.S. Cl.
CPC ..... *G06K 9/00268* (2013.01); *G06K 9/00288* (2013.01); *H04N 1/00336* (2013.01); *G06F 16/182* (2019.01); *G06K 9/00221* (2013.01); *G06K 2209/27* (2013.01); *H04N 1/00127* (2013.01); *H04N 1/00204* (2013.01); *H04N 1/00244* (2013.01); *H04N 1/00307* (2013.01)

(58) Field of Classification Search
CPC ........... G06K 2209/27; G06K 9/00221; G06K 9/00228; G06K 9/00268; G06K 9/00288; H04N 1/00127; H04N 1/00204; H04N 1/00244; H04N 1/00307; H04N 1/00336
See application file for complete search history.

(56) References Cited

U.S. PATENT DOCUMENTS

| | | | | |
|---|---|---|---|---|
| 2013/0266193 | A1* | 10/2013 | Tiwari | G06F 16/5854 382/115 |
| 2014/0161238 | A1 | 6/2014 | Koyama et al. | |
| 2014/0181157 | A1 | 6/2014 | Houston et al. | |
| 2015/0331861 | A1 | 11/2015 | Tai et al. | |

FOREIGN PATENT DOCUMENTS

| | | |
|---|---|---|
| CN | 105100642 | 11/2015 |
| CN | 105678266 | 6/2016 |
| CN | 107222576 | 9/2017 |
| CN | 108256466 | 7/2018 |
| EP | 3086245 | 10/2016 |
| WO | 2019051795 | 3/2019 |

OTHER PUBLICATIONS

SIPO, First Office Action for CN Application No. 201810032305.9, dated Dec. 23, 2019.
Apple Support, "About People in Photos on your iPhone, iPad or iPod Touch," retrieved from internet May 2019, pp. 1-4, < https://web.archive.org/web/20170929021603/https://support.apple.com/en-us/HT207103>.
Apple Support, "iCloud Photo Library," retrieved from internet Jul. 2019, pp. 1-4, <https://web.archive.org/web/20170915223341/https://support.apple.com/en-us/HT204264>.
EPO, Office Action for EP Application No. 19151322, dated Jun. 14, 2019.
WIPO, English Translation of the ISR and WO for PCT/CN2019/071332, dated Apr. 11, 2019.
EPO, Communication for EP Application No. 19151322.5, dated Dec. 21, 2020.
IPI, Office Action for IN Application No. 201914001417, dated Jan. 27, 2021.

* cited by examiner

DATA PROCESSING METHOD, ELECTRONIC DEVICE, AND COMPUTER-READABLE STORAGE MEDIUM

CROSS-REFERENCE TO RELATED APPLICATIONS

This application is based on and claims priority of Chinese Patent Application No. 201810032305.9, filed on Jan. 12, 2018, the entire contents of which are incorporated herein by reference.

FIELD

The present disclosure relates to a computer technology field, and more particularly to a data processing method, an electronic device, and a computer-readable storage medium.

BACKGROUND

With popularization of electronic devices and rapid development of mobile internet, more and more users begin to use the electronic devices. An album function has become a common application of the electronic device, which is used frequently by the user. An album of the electronic device typically stores a large number of images. Image data may be synchronized in different electronic devices. However, in the related art, when data synchronization is performed, image data in one electronic device is configured as reference to clear or cover image data in other electronic devices, which may cause data lost, inaccurate data synchronization or the like, such that an effect of image data synchronization is poor.

DISCLOSURE

Embodiments of the present disclosure provide a data processing method an electronic device, and a computer-readable storage medium.

The data processing method includes: acquiring first image data of images stored in a local device and second image data of images stored in another device; comparing the first image data with the second image data to determine a storage type of an image contained in the first image data and/or contained in the second image data, the storage type including at least one of: both storing in the local device and storing in the another device, only storing in the local device, and only storing in the another device; establishing a mapping relation between a first face group contained in the first image data and a second face group contained in the second image data according to the storage type; and processing the first image data and the second image data according to the mapping relation with regard to the first face group and the second face group having the mapping relation with each other.

The electronic device includes a memory and a processor. The memory is configured to store computer programs that, when executed by the processor, cause the processor to implement the aforementioned data processing method.

The computer-readable storage medium stores with computer programs that, when executed by a processor, cause the processor to implement the aforementioned data processing method.

EMBODIMENTS OF THE PRESENT DISCLOSURE

In order to more clearly explain objectives, technical solutions and advantages of the present disclosure, the present disclosure will be described below with reference to the accompanying drawings and the embodiments of the present disclosure. The embodiments described herein with reference to drawings are explanatory, illustrative, and used to generally understand the present disclosure. The embodiments shall not be construed to limit the present disclosure.

In the specification, it is to be understood that terms such as "first" and "second" are used herein for describing various elements, these elements should not be limited by these terms. These terms are only used for distinguishing one element from another element. For example, a first client may also be called a second client, and similarly, the second client may also be called the first client, without departing from the scope of the present disclosure. The first client and the second client are both a client, but are not the same client.

Figure 1:
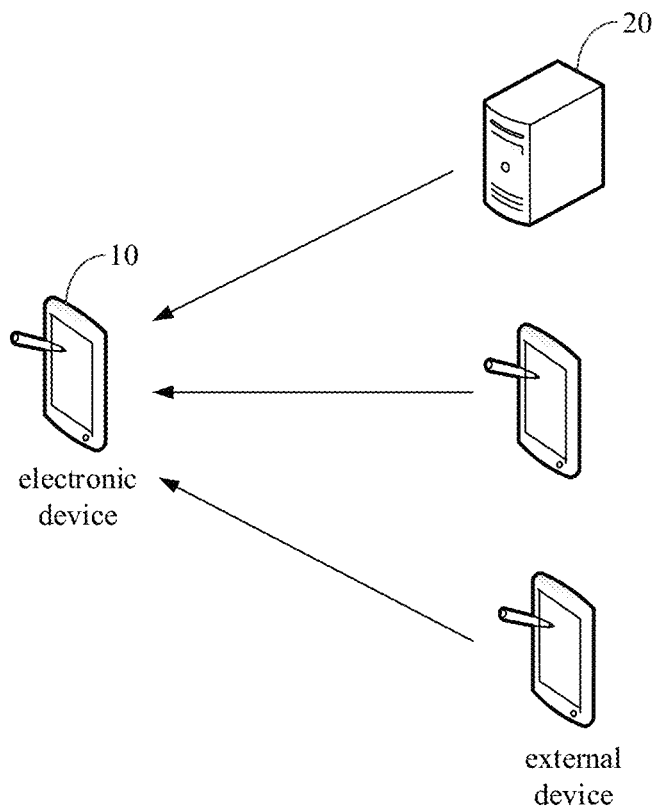
FIG. 1 is a schematic diagram of an application scene of a data processing method according to embodiments of the present disclosure.

FIG. 1 is a schematic diagram of an application scene of a data processing method according to embodiments of the present disclosure. As illustrated in FIG. 1, image data synchronization can be realized between an electronic device 10 (which may be considered as a local device) and another device 20 (which may be an external device). The another device 20 may be an electronic device, such as a server, a server cluster, or a mobile terminal. The electronic device 10 may acquire first image data of images stored in the electronic device and receive second image data of images from the another device 20. The electronic device 10 may compare the first image data with the second image data to determine a storage type of an image contained in the first image data and/or contained in the second image data. The storage type may include at least one of: both storing in the local device and storing in the another device 20, only storing in the local device, and only storing in the another device 20. The electronic device 10 may establish a mapping relation between a second face group contained in the second image data and a first face group contained in the first image data according to the storage type and merge the first image data containing the first face group and the second image data containing the second face group having the mapping relation with the first face group for the second face group and the first face group having the mapping relation with each other.

Figure 2:
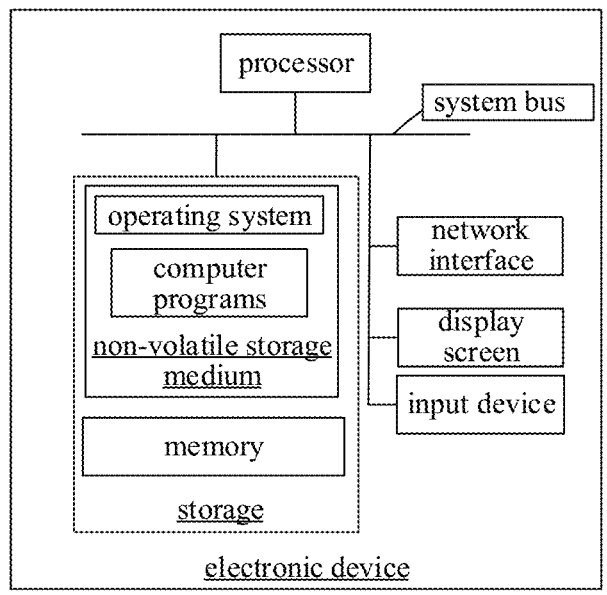
FIG. 2 is a block diagram of an electronic device according to an embodiment of the present disclosure.

FIG. 2 is a block diagram of an electronic device according to an embodiment of the present disclosure. As illustrated in FIG. 2, the electronic device includes a processor, a storage, a network interface, a display screen and an input device coupled via a system bus. The storage may include a non-volatile storage medium and a memory. The non-volatile storage medium of the electronic device stores an operating system and computer programs. The computer programs are executed by the processor to implement the data processing method according to an embodiment of the present disclosure. The processor is configured to provide calculation and control capacity for supporting operations of the entire electronic device. The memory in the electronic device is configured to provide running environment for the computer programs in the non-volatile storage medium. The network interface of the electronic device is configured to perform data transmission with other electronic devices (for example, a server, a mobile terminal etc.). The display screen of the electronic device may be a liquid crystal display screen or E-ink display screen. The input device may be a touch layer covering the display screen or a key, a trackball or a touch panel disposed on a shell of the electronic device, or may be an external keyboard, an external touch panel or a mouse etc. The electronic device may be a mobile terminal, such as a phone, a tablet personal computer, a personal digital assistant or a wearable device, or may be a server. It can be understood that, the structure in FIG. 2 merely illustrates a block diagram of a partial structure related to the technical solutions of the present disclosure, which shall not constitute limitation to the electronic device in which the technical solution of the present disclosure is applicable. The electronic device may include more or less than components illustrated, or may combine some components, or may arrange the components in different ways.

Figure 3:
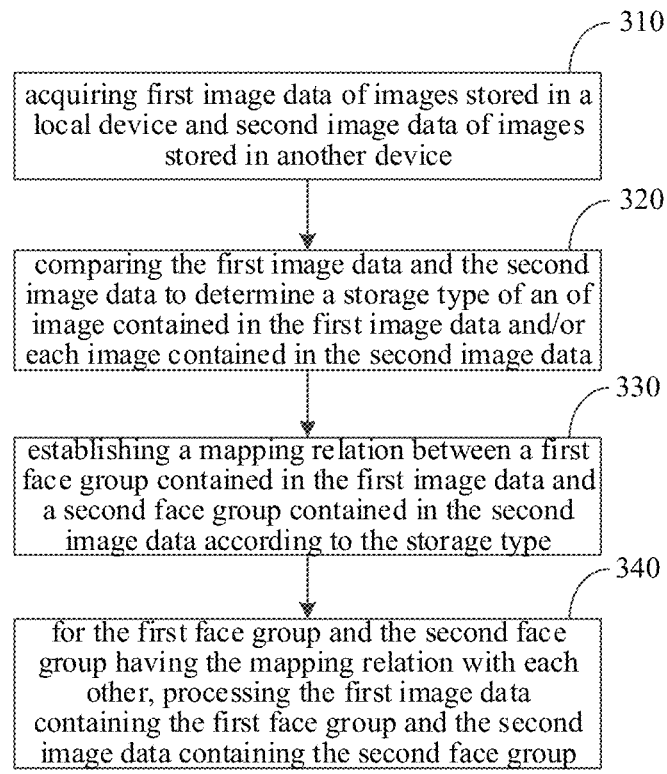
FIG. 3 is a flow chart of a data processing method according to an embodiment of the present disclosure.

As illustrated in FIG. 3, in one embodiment, a data processing method is provided. The method includes the followings.

At block 310, first image data of images stored in a local device and second image data of images stored in another device are acquired.

The electronic device may receive image data synchronized from another device. The another device may be a server or a server cluster, or may be a terminal, for example a smart phone, a tablet personal computer or other electronic devices. The electronic device may acquire the first image data stored in the electronic device and receive the second image data stored in the another device from the another device. The first image data stored in the electronic device refers to image data stored in the electronic device before the electronic device receives the image data synchronized from the another device.

The first image data may include first image information of an image stored in the electronic device, first face data contained in the image stored in the electronic device and first face groups corresponding to faces contained in the first face data. The first image information may include but be not limited to an image identification, a first storage path or the like. The image identification may be formed by one or more of numbers, characters and letters. The image identification may be a multimedia number, a name of the image. The first face data contained in the image stored in the electronic device refers to a face recognition result acquired by performing face recognition on the image stored in the electronic device. The first face data may include but be not limited to a face number, a face size, a face feature or the like. The first face group may refer to face group data stored in the electronic device. The face group data may include but be not limited to a group number, a creating time, or corresponding face data of each first face group. After the face recognition is performed on images, the images can be clustered according to face features acquired by the face recognition. A face recognized from an image and a face group corresponding to the face can be determined according to a clustering result, and the image can be added to the corresponding face group.

The second image data may include second image information of an image stored in the another device which may participate in data synchronization, second face data contained in the image stored in the another device and second face groups corresponding to faces contained in the second face data. The second image information may include but be not limited to an image identification, a second storage path or the like. The second face data contained in the image stored in the another device refers to a face recognition result acquired by performing face recognition on the image stored in the another device which may participate in the data synchronization. The second face data may include but be not limited to a face number, a face size, a face feature or the like. The second face group may refer to face group data stored in the another device which may participate in the data synchronization. The face group data may include but be not limited to a group number, a creating time, or face data corresponding of each second face group.

At block 320, the first image data and the second image data are compared to determine a storage type of an image contained in the first image data and/or contained in the second image data.

The electronic device may compare the first image data stored in the electronic device with the second image data received from the another device to classify the images stored in the electronic device and/or the images stored in the another device and to determine the storage type of each of the images. The storage type may include at least one of: both storing in the local device and storing in the another device, only storing in the local device, and only storing in the another device. An image both storing in the local device and storing in the another device refers to that the image is stored in the local device and stored in the another device which may participate in the data synchronization. An image only storing in the local device refers to that the image is only stored in the local device but not stored in the another device. An image only storing in the another device refers to that the image is only stored in the another device but not stored in the local device. The storage type of the image may be one of both storing in the local device and storing in the another device, only storing in the local device, and only storing in the another device.

In an embodiment, the electronic device may determine the storage types of images by comparing the storage paths of the images. The electronic device may compare each first storage path in the first image data with each second storage path in the second image data and determine a storage type of each image according to a comparison result. After the comparison, when a second storage path and a first storage path are identical, it indicates that the image with the identical storage path is both stored in the local device and stored in the another device which may participate in the data synchronization. The storage type of the image is determined as both storing in the local device and storing in the another device. When there is no second storage path the same as a first storage path, it indicates that the image with the first storage path is only stored in the local device. The storage type of the image is determined as only storing in the local device. When there is no first storage path the same as a second storage path, it indicates that the image with the second storage path is only stored in the another device. The storage type of the image is determined as only storing in the another device.

In an embodiment, the electronic device may compare message digests of images to determine the storage types of the images. The image digest is also called as digital digest. Each message digest is a value uniquely corresponding to one message or text and having a fixed length. The message digest of an image may be MD5 (Message Digest Algorithm MD5) of the image or may be other hash algorithms. The electronic device may compare each first message digest in the first image data with each second message digest in the second image data to determine the storage type of each image. When a second message digest and a first message digest are identical, it indicates that the images with the identical message digest are the same, such that the image with the identical message digest is stored in the local device and in the another device which may participate in the data synchronization. The storage type of the image is determined as both storing in the local device and storing in the another device. When there is no second message digest the same as a first message digest, the storage type of the image with the first message digest is determined as only storing in the local device. When there is no first message digest the same as a second message digest, the storage type of the image with the second message digest is determined as only storing in the another device. In some embodiments, other ways can be used to determine the storage types of the images, which is not limited herein.

At block 330, a mapping relation between a first face group contained in the first image data and a second face group contained in the second image data is established according to the storage type.

The electronic device may establish the mapping relation between the second face group contained in the second image data and the first face group contained in the first image data according to a preset establishing way corresponding to the storage type of the image. Establishing the mapping relation between the second face group and the first face group refers to that the second face group stored in the another device are mapped to the first face group stored in the local device to establish image data sets having the mapping relation with each other. The first face group and the second face group having the mapping relation with each other may be considered as a same face group.

Different storage types correspond to different mapping relation establishing ways. After the electronic device determines the storage type of each image, the electronic device may perform the face recognition and face group mapping on images with the same storage type according to the preset way corresponding to the same storage type. The electronic device may perform face matching on faces contained in an image according to the storage type of the image, to determine whether the faces contained in the image are both stored in the local device and stored in the another device. The electronic device may determine same face groups and differential face groups stored in the local device and stored in the another device according to storage of faces. A first face group stored in the local device and a second face group stored in the another device that contain the same face data can be considered as the same face group. A first face group only stored in the local device, a second face group only stored in the another device, or a first face group and a second face group corresponding to a same face that contain different face data can be considered as the differential face group, which may correspond to different mapping relation establishing ways. For example, a new face group may be created in the local device to map a second face group only stored in the another device, or a mapping relation between same face groups can be established, however, the present disclosure is not limited herein.

In an embodiment, after the electronic device establishes the mapping relation between the second face group and the first face group, the electronic device maps the second face group to the first face group and adds mapping tags into the first face group and the second face group having the mapping relation with each other. In an embodiment, the mapping relation between the first face group and the second face group may be a Map set. A tag "value" can be set for the first face group and a tag "key" can be set for the second face group. One key may be mapped to one value.

The group numbers of face groups in different electronic devices may be different. For example, a group number of a face group corresponding to face A stored in the local device may be 001, and a group number of a face group corresponding to the face A stored in the another device may be 100. When the face group stored in the local device and the face group stored in the another device are merged directly, the image of face A may be distributed to different face groups, such that the synchronized image data may be inaccurate. In an embodiment, after determining the storage type of each image, the electronic device may establish the mapping relation between the second face group stored in the another device and the first face group stored in the local device according to an establishing way corresponding to the storage type. For example, the mapping relation between the face group with the group number 100 stored in the another device and the face group with the group number 001 stored in the local device can be established to map the face group with the group number 100 stored in the another device to the face group with the group number 001 stored in the local device, such that the synchronized image data can be merged and classified accurately.

At block 340, for the first face group and the second face group having the mapping relation with each other, the first image data containing the first face group and the second image data containing the second face group are merged.

After the electronic device establishes the mapping relation between the second face group and the first face group, for the first face group and the second face group having the mapping relation with each other, the first image data containing the first face group and the second image data containing the second face group are merged, such that the image data corresponding to the first face group and the second face group having the mapping relation with each other can be merged. The electronic device may merge the first image information and the first face data corresponding to the first face group with the second image information and the second face data corresponding to the second face group having the mapping relation with the first face group. The electronic device may transfer the second face group stored in the another device to the first face group stored in the local device. When the user browses the images in the electronic device, the electronic device may display the image data synchronized from the another device accurately according to the mapping relation, i.e., displaying the images corresponding to the first face group and the second face group having the mapping relation with each other in a same album. By merging the data according to the mapping relation, a compatibility of the face group stored in the another device may be realized without changing the group number of the first face group stored in the local device.

In the embodiment, the first image data of the images stored in the local device is compared with the second image data of the images stored in the another device to determine the storage type of the image contained in the first image data and/or contained in the second image data, the mapping relation between the second face group contained in the second image data and the first face group contained in the first image data can be established according to the storage type, and the first image data and the second image data are merged for the first face group and the second face group having the mapping relation with each other. In this way, not only the face group stored in the local device can be reserved but also the image data synchronized from the another device may be merged accurately, such that the effect of image data synchronization can be improved.

Figure 4:
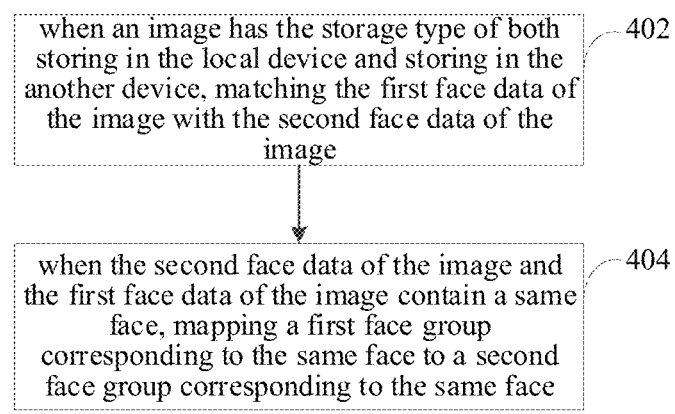
FIG. 4 is a flow chart illustrating a process of establishing a mapping relation between a second face group and a first face group according to an embodiment of the present disclosure.

As illustrated in FIG. 4, in an embodiment, block 330 of establishing the mapping relation between the first face group contained in the first image data and second face group contained in the second image data according to the storage types of the images includes the followings.

At block 402, when an image has the storage type of both storing in the local device and storing in the another device, the first face data of the image is matched with the second face data of the image.

The electronic device may establish the mapping relation between the first face group and the second face group according to the storage type. When the storage type of an image is the storage type of both storing in the local device and storing in the another device, the first face data of the image is matched with the second face data of the image. The first face data may record a face recognition result of the image stored in the local device. The second face data may record a face recognition result of the image stored in the another device. Each face contained in the first face data is matched with each face contained in the second face data, if a face contained in the first face data matches a face contained in the second face data, it indicates that they are the same face.

For example, the first face data of an image includes face 1, face 2 and face 3. The second face data of the image includes face a, face b and face c. The electronic device may match the face 1, the face 2 and the face 3 of the first face data with the face a, the face b and the face c of the second face data respectively. The electronic device may analyze face features of two faces to calculate a similarity of the two faces according to the face features of the two faces. When the similarity is greater than a predetermined threshold, the electronic device may determine that the two faces are matched with each other and thus determine that the two faces are the same face. When the face 1 matches the face a, the face 2 matches the face b and the face 3 matches the face c, it may be determined that the face 1 and the face a are the same face, the face 2 and the face b are the same face, and the face 3 and the face c are the same face.

At block 404, when the second face data of the image and the first face data of the image contain a same face, a first face group corresponding to the same face is mapped to a second face group corresponding to the same face.

When the electronic device determines that the second face data and the first face data of the image contain the same face, the second face group corresponding to the same face may be mapped to the first face group corresponding to the same face. For example, when the face 1 of the image stored in the local device and the face a of the image stored in the another device are the same face, the face a belongs to the second face group with the group number 100 stored in the another device and the face 1 belongs to the first face group with the group number 001 stored in the local device, the second face group with the group number 100 stored in the another device may be mapped to the first face group with the group number 001 stored in the local device.

When the electronic device determines that the second face data and the first face data of the image contain the same face, the electronic device may detect whether the first face group corresponding to the same face has a mapping relation. The electronic device may determine whether a second face group is mapped to the first face group corresponding to the same face. When the first face group corresponding to the same face has no mapping relation, the electronic device may establish the mapping relation between the second face group corresponding to the same face and the first face group corresponding to the same face, to map the second face group corresponding to the same face to the first face group corresponding to the same face. When the first face group corresponding to the same face has the mapping relation, the electronic device may determine whether the second face group having the mapping relation with the first face group corresponding to the same face is consistent with the second face group corresponding to the same face. When the second face group having the mapping relation with the first face group corresponding to the same face is consistent with the second face group corresponding to the same face, the mapping relation is maintained. When the second face group having the mapping relation with the first face group corresponding to the same face is inconsistent with the second face group corresponding to the same face, the electronic device may create a new face group in the local device and establish the mapping relation between the new face group with the second face group corresponding to the same face. In an embodiment, the electronic device may acquire a maximum group number stored in the local device and generate a new group number by adding 1 to the maximum group number, so as to create the new face group in the local device and map the second face group corresponding to the same face to the new face group. However, other ways can be used to create the new face group, i.e., the face group creating way is not limited in the present disclosure.

When the first face group corresponding to the same face has the mapping relation and the second face group having the mapping relation with the first face group corresponding to the same face is inconsistent with the first face group corresponding to the same face, it indicates different face recognition results are acquired from the another and the local device. By directly mapping the second face group corresponding to the same face to the new face group created in the local device, the face recognition result different from that in the another device may be stored in the local device without updating a large amount of data, such that data merging can be realized after data synchronization.

For example, after the electronic device performs face data matching, the face 1 of the image stored in the local device and the face a of the image stored in the another device are the same face, the face a belongs to the second face group with the group number 100 stored in the another device, and the face 1 belongs to the first face group with the group number 001 stored in the local device. The electronic device may detect whether the first face group with the group number 001 stored in the local device has the mapping relation, if not, the mapping relation between the second face group with the group number 100 stored in the another device and the first face group with the group number 001 stored in the local device can be established. When the first face group with the group number 001 stored in the local device has the mapping relation and the second face group having the mapping relation with the first face group with the group number 0011 stored in the local device is the second face group with the group number 100 stored in the another device, which is the second face group containing face a stored in the another device, the mapping relation can be maintained, i.e., the mapping relation is kept unchanged. When the second face group having the mapping relation with the first face group with the group number 0011 stored in the local device is the second face group with the group number 98 stored in the another device, which is inconsistent with the second face group containing face a stored in the another device, the electronic device may create a new face group with the group number 034 in the local device and establish the mapping relation between the second face group with the group number 100 stored in the another device and the first face group with the group number 034 stored in the local device.

In embodiments of the present disclosure, the second face group corresponding to the same face may be mapped to the first face group corresponding to the same face, such that the face group stored in the another device may be merged while reserving the face group stored in the local device. Therefore, data synchronization and merging for image data from multiple devices can be realized.

Figure 5:
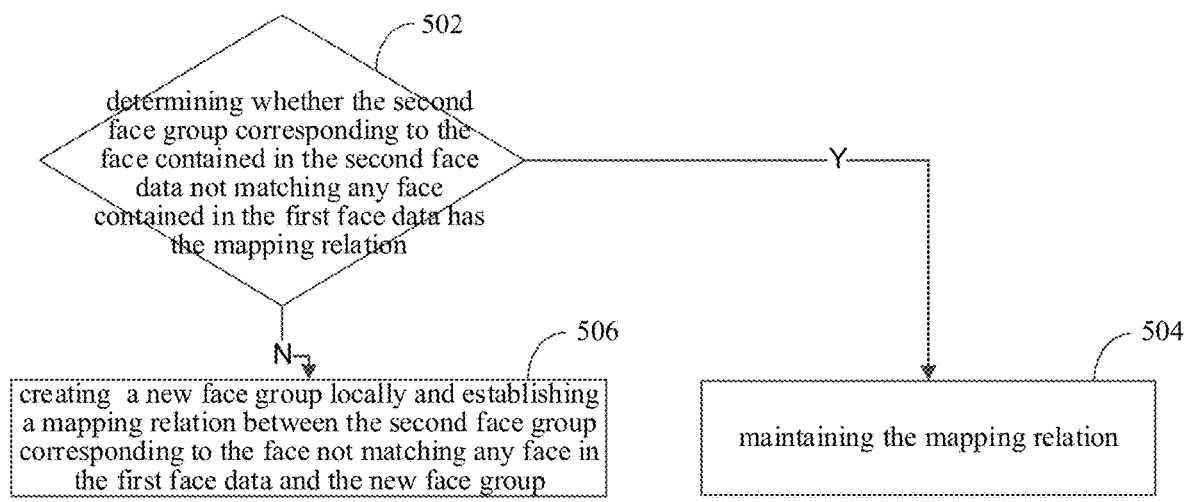
FIG. 5 is a flow chart illustrating a process of establishing a mapping relation between a second face group and a first face group according to another embodiment of the present disclosure.

As illustrated in FIG. 5, in an embodiment, block 330 of establishing the mapping relation between the first face group contained in the first image data and second face group contained in the second image data according to the storage types of the images further includes the followings.

At block 502, it is determined whether the second face group corresponding to the face contained in the second face data not matching any face contained in the first face data has the mapping relation, if yes, an act at block 504 is executed, it no, an act at block 506 is executed.

The electronic device matches the first image data with the second image data of the image. When the face contained in the second face data does not match any face contained in the first face data, it may be determined that the face is additionally recognized in the another device which may participate in the data synchronization. The electronic device may determine whether the second face group corresponding to the face additionally recognized in the another device has a mapping relation, if yes, the mapping relation can be maintained.

At block 504, the mapping relation is maintained.

At block 506, a new face group is created in the local device and a mapping relation between the second face group corresponding to the face not matching any face in the first face data and the new face group is established.

If the second face group corresponding to the face additionally recognized in the another device has no mapping relation, the electronic device may create the new face group in the local device and establish the mapping relation between the second face group corresponding to the face additionally recognized in the another device and the new face group, so as to map the second face group corresponding to the face additionally recognized in the another device to the new face group.

For example, when the first image data of the image stored in the local device includes face 1, while the second image data of the image stored in the another device includes face a and face b, if the face 1 matches the face a, i.e., the face 1 and the face a are the same face, but the face b does not match any face in the first face data, the electronic device may determine that the face b is additionally recognized in the another device. If the face b belongs to the second face group with the group number 063 stored in the another device and the second face group has no mapping relation, the electronic device may create the new face group with the group number 043 in the local device and establish the mapping relation between the second face group with the group number 063 stored in the another device and the new face group with the group number 043 stored in the local device.

In an embodiment, the electronic device matches with the first image data with the second image data of the image, when a face contained in the first face data of the image does not match any face contained in the second face data, it may be determined that the face is additionally recognized in the local device, and the electronic device may reserve the first face group corresponding to the face not matching any face in the second face data.

In an embodiment, the different face recognition results acquired from the local device and from the another device may be merged accurately according to the mapping relation, such that the face group stored in the another device may be merged while reserving the face group stored in the local device, thus improving the effect of image data synchronization.

In an embodiment, block 330 of establishing the mapping relation between the first face group contained in the first image data and second face group contained in the second image data according to the storage types of the images includes: when an image has the storage type of only storing in the another device, determining whether a second face group corresponding to a face contained in the second face data of the image has a mapping relation, if yes, maintaining the mapping relation; when the second face group corresponding to the face contained in the second face data of the image has the mapping relation, maintaining the mapping relation; and when the second face group corresponding to the face contained in the second face data of the image has no mapping relation, creating a new face group in the local device and establishing a mapping relation between the second face group corresponding to the face contained in the second face data of the image and the new face group.

When the storage type of the image is the storage type of only storing in the another device, each face contained in the second face data of the image can be considered as the image additionally recognized in the another device. The electronic device may determine whether the second face group corresponding to the face contained in the second face group of the image has a mapping relation. When the second face group corresponding to the face contained in the second face group of the image has the mapping relation, the mapping relation can be maintained. When the second face group corresponding to the face contained in the second face group of the image has no mapping relation, the electronic device may create the new face group in the local device and establish the mapping relation between the second face group corresponding to the face contained in the second face group of the image and the new face group, so as to map the second face group corresponding to the face contained in the second face group of the image to the new face group.

For example, when the storage type of the image is the storage type of only storing in the another device, the second face data of the image includes face x and face y, the face x belongs to the second face group with the group number 070 stored in the another device, the face y belongs to the second face group with the group number 071 stored in the another device. The second face group with the group number 070 stored in the another device has the mapping relation with the first face group with the group number 012 stored in the local device, the electronic device may maintain the mapping relation. The second face group with the group number 071 stored in the another device has no mapping relation, the electronic device may create the new face group with the group number 037 in the local device and establish the mapping relation between the second face group with the group number 071 stored in the another device and the first face group with the group number 037 stored in the local device.

In an embodiment, when the storage type of the image is the storage type of only storing in the local device, each face contained in the first face data of the image can be considered as the image additionally recognized in the local device. The electronic device may reserve the first face group corresponding to the face contained in the first face data of the image.

In the embodiment, the different image data stored in the local device and from the another device may be merged accurately according to the mapping relation, such that the face group stored in the another device may be synchronized and merged accurately while reserving the face group stored in the local device, thus improving the effect of image data synchronization.

In an embodiment, a data processing method is provided including: operation (1), acquiring first image data of images stored in the local device and second image data of images stored in an external device; operation (2), comparing the first image data with the second image data to determine a storage type of an image contained in the first image data and/or contained in the second image data, the storage type including at least one of: both storing in the local device and storing in the another device, only storing in the local device, and only storing in the another device; operation (3), establishing a mapping relation between a first face group contained in the first image data and a second face group contained in the second image data according to the storage type; and operation (4), processing the first image data and the second image data for the first face group and the second face group with the mapping relation with each other.

In an embodiment, comparing the first image data with the second image data to determine the storage type of the image contained in the first image data includes: comparing a first storage path of the image contained in the first image data with each second storage path contained in the second image data; when a second storage path is identical to the first storage path, determining the storage type of the image as both storing in the local device and storing in the another device; when no second storage path is identical to the first storage path, determining the storage type of the image as only storing in the local device.

In an embodiment, comparing the first image data with the second image data to determine the storage type of the image contained in the second image data includes: comparing each storage path contained in the first image data with a second storage path of the image contained in the second image data; when a first storage path is identical to the second storage path, determining the storage type of the image as both storing in the local device and storing in the another device; and when no first storage path is identical to the second storage path, determining the storage type of the image as only storing in the another device.

In an embodiment, the first image data contains first face data of each image stored in the local device and the first face group corresponding to a face contained in the first face data. The second image data contains second face data of each image stored in another device and the second face group corresponding to a face contained in the second face data. Operation (3) includes: when an image has the storage type of both storing in the local device and storing in the another device, matching the first face data of the image with the second face data of the image; and when the first face data of the image and the second face data of the image contain a same face, mapping a second face group corresponding to the same face to a first face group corresponding to the same face.

In an embodiment, mapping the second face group corresponding to the same face to the first face group corresponding to the same face includes: detecting whether the first face group corresponding to the same face has a mapping relation; and in response to detecting that the first face group corresponding to the same face has no mapping relation, establishing a mapping relation between the first face group corresponding to the same face and the second face group corresponding to the same face.

In an embodiment, operation (3) further includes: in response to detecting that the first face group corresponding to the same face has the mapping relation, determining whether a second face group having the mapping relation with the first face group corresponding to the same face is consistent with the second face group corresponding to the same face; and when the second face group having the mapping relation with the first face group corresponding to the same face is consistent with the second face group corresponding to the same face, maintaining the mapping relation.

In an embodiment, operation (3) further includes: when the second face group having the mapping relation with the first face group corresponding to the same face is inconsistent with the second face group corresponding to the same face, creating a new face group in the local device; and establishing a mapping relation between the second face group corresponding to the same face and the new face group.

In an embodiment, after matching the first face data of the image with the second face data of the image, the method further includes: when the second face data of the image contains a face not matching any face contained in the first face data of the image, determining whether a second face group corresponding to the face not matching any face contained in the first face data has a mapping relation; when the second face group corresponding to the face not matching any face contained in the first face data has the mapping relation, maintaining the mapping relation; and when the second face group corresponding to the face not matching any face contained in the first face data has no mapping relation, creating a new face group in the local device and establishing a mapping relation between the second face group corresponding to the face not matching any face contained in the first face data and the new face group.

In an embodiment, after matching the first face data of the image with the second face data of the image, the method further includes: when the first face data of the image contains a face not matching any face contained in the second face data of the image, reserving a first face group corresponding to the face not matching any face contained in the second face data.

In an embodiment, operation (3) includes: when an image has the storage type of only storing in the another device, determining whether a second face group corresponding to a face contained in second face data of the image has a mapping relation; and when the second face group corresponding to the face contained in the second face data of the image has the mapping relation, maintaining the mapping relation; and when the second face group corresponding to the face contained in the second face data of the image has no mapping relation, creating a new face group in the local device and establishing a mapping relation between the second face group corresponding to the face contained in the second face data of the image and the new face group.

In an embodiment, operation (3) includes: when an image has the storage type of only storing in the local device, reserving a first face group corresponding to a face contained in the first face data of the image.

In the embodiment, the first image data of the images stored in the local device is compared with the second image data of the images stored in the another device to determine the storage type of the image contained in the first image data and/or contained in the second image data, the mapping relation between the second face group contained in the second image data and the first face group contained in the first image data can be established according to the storage type, and the first image data and the second image data are merged for the first face group and the second face group having the mapping relation with each other. In this way, not only the face group stored in the local device can be reserved but also the image data synchronized from the another device may be merged accurately, such that the effect of image data synchronization can be improved.

It should be understood that, although various steps in the aforementioned flow chart are executed in an order according to indication of arrows, those steps are not necessarily executed according to the order indicated by the arrows. Unless specified or limited otherwise, the present disclosure is not limited by the order of the steps, some steps may be performed in other orders according to present disclosure. Moreover, at least part of steps in the above flow chart may include a plurality of sub-steps or a plurality of stages. Those sub-steps or stages are not necessarily performed simultaneously but can be executed at different time. Those sub-steps or stages are not necessarily performed in sequence but can be performed alternately together with at least part of other steps or sub-steps or stages of other steps.

Figure 6:
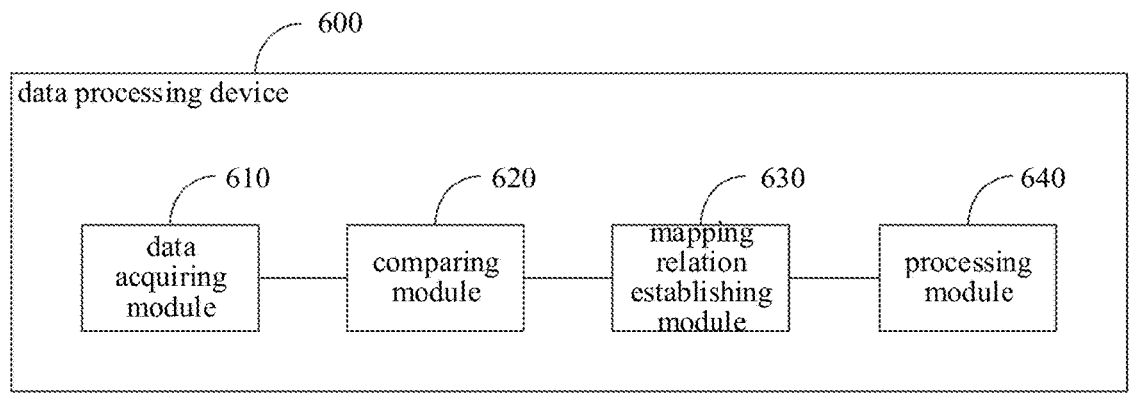
FIG. 6 is a block diagram of a data processing device according to an embodiment of the present disclosure.

As illustrated in FIG. 6, in an embodiment, a data processing device 600 is provided. The device 600 includes a data acquiring module 610, a comparing module 620, a mapping relation establishing module 630 and a processing module 640.

The data acquiring module 610 is configured to acquire first image data of images stored in the local device and second image data of images stored in another device.

The comparing module 620 is configured to compare the first image data with the second image data to determine a storage type of an image contained in the first image data and/or contained in the second image data, the storage type including at least one of: both storing in the local device and storing in the another device, only storing in the local device, and only storing in the another device.

The comparing module 630 includes a comparing unit and a type determining unit.

The comparing unit is configured to compare each first storage path in the first image data with each second storage path in the second image data.

The type determining unit is configured to, when a first storage path and a second storage path are identical, determine a storage type of an image with the identical storage path as both storing in the local device and storing in the another device.

The type determining unit is further configured to, when a first storage path is different from any second storage path, determining a storage type of an image with the first storage path as only storing in the local device.

The type determining unit is further configured to, when a second storage path is different from any first storage path, determining a storage type of an image with the second storage path as only storing in the another device.

The mapping relation establishing module 630 is configured to establish a mapping relation between a first face group contained in the first image data and a second face group contained in the second image data according to the storage type.

The processing module 640 is configured to process the first image data and the second image data for the first face group and the second face group having the mapping relation with each other.

In the embodiment, the first image data of the images stored in the local device is compared with the second image data of the images stored in the another device to determine the storage type of each of the images stored in the local device and the images stored in the another device, the mapping relation between the second face group contained in the second image data and the first face group contained in the first image data can be established according to the storage type, and the first image data and the second image data are merged for the first face group and the second face group having the mapping relation with each other. In this way, not only the face group stored in the local device can be reserved but also the image data synchronized from the another device may be merged accurately, such that the effect of image data synchronization can be improved.

Figure 7:
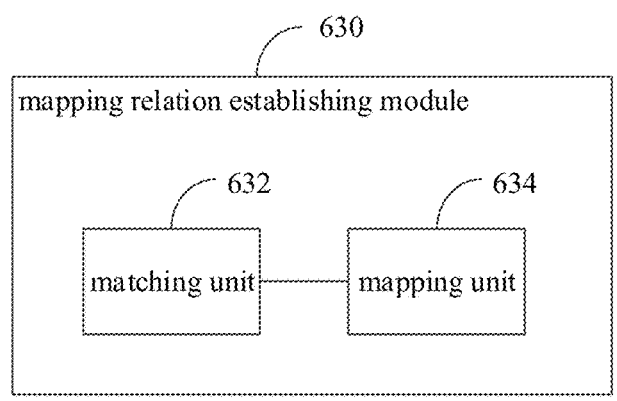
FIG. 7 is a block diagram of a mapping relation establishing module according to an embodiment of the present disclosure.

In an embodiment, the first image data contains first face data of each image stored in the local device and the first face group corresponding to a face contained in the first face data. The second image data contains second face data of each image stored in another device and the second face group corresponding to a face contained in the second face data. As illustrated in FIG. 7, the mapping relation establishing module 630 includes a matching unit 632 and a mapping unit 634.

The matching unit 632 is configured to, when an image has the storage type of both storing in the local device and storing in the another device, match the first face data of the image with the second face data of the image.

The mapping unit 634 is configured to, when the first face data of the image and the second face data of the image contain a same face, map a second face group corresponding to the same face to a first face group corresponding to the same face.

In an embodiment, the mapping unit 634 is further configured to: detect whether the first face group corresponding to the same face has a mapping relation; and in response to detecting that the first face group corresponding to the same face has no mapping relation, establish a mapping relation between the first face group corresponding to the same face and the second face group corresponding to the same face.

In an embodiment, the mapping unit 634 is further configured to: in response to detecting that the first face group corresponding to the same face has the mapping relation, determine whether a second face group having the mapping relation with the first face group corresponding to the same face is consistent with the second face group corresponding to the same face; and when the second face group having the mapping relation with the first face group corresponding to the same face is consistent with the second face group corresponding to the same face, maintain the mapping relation.

In an embodiment, the mapping unit 634 is further configured to: when the second face group having the mapping relation with the first face group corresponding to the same face is inconsistent with the second face group corresponding to the same face, create a new face group in the local device; and establish a mapping relation between the second face group corresponding to the same face and the new face group.

In the embodiment, the second face group corresponding to the same face can be mapped to the first face group corresponding to the same face, such that the face group stored in the another device can be merged while reserving the face group stored in the local device. Therefore, data synchronization and merging for the image data from multiple devices can be realized accurately.

In an embodiment, the mapping unit 634 is further configured to: when the second face data of the image contains a face not matching any face contained in the first face data of the image, determine whether a second face group corresponding to the face not matching any face contained in the first face data has a mapping relation; when the second face group corresponding to the face not matching any face contained in the first face data has the mapping relation, maintain the mapping relation; and when the second face group corresponding to the face not matching any face contained in the first face data has no mapping relation, create a new face group in the local device and establish a mapping relation between the second face group corresponding to the face not matching any face contained in the first face data and the new face group.

In an embodiment, the mapping unit 634 is further configured to, when the first face data of the image contains a face not matching any face contained in the second face data of the image, reserve a first face group corresponding to the face not matching any face contained in the second face data.

In the embodiment, different face recognition results stored in the local device and stored in the another device can be merged accurately according to the mapping relation, such that the face group stored in the another device can be synchronized and mapped while reserving the face group stored in the local device, thus improving the effect of image data synchronization.

In an embodiment, the mapping relation establishing module 630 is further configured to, when an image has the storage type of only storing in the another device, determine whether a second face group corresponding to a face contained in second face data of the image has a mapping relation; when the second face group corresponding to the face contained in the second face data of the image has the mapping relation, maintain the mapping relation; and when the second face group corresponding to the face contained in the second face data of the image has no mapping relation, create a new face group in the local device and establish a mapping relation between the second face group corresponding to the face contained in the second face data of the image and the new face group.

The mapping relation establishing module 630 is further configured to, when an image has the storage type of only storing in the local device, reserve a first face group corresponding to a face contained in first face data of the image.

In the embodiment, different image data stored in the local device and stored in the another device can be merged accurately according to the mapping relation, such that the face group stored in the another device can be synchronized and merged accurately while reserving the face group stored in the local device, thus improving the effect of image data synchronization.

Figure 8:
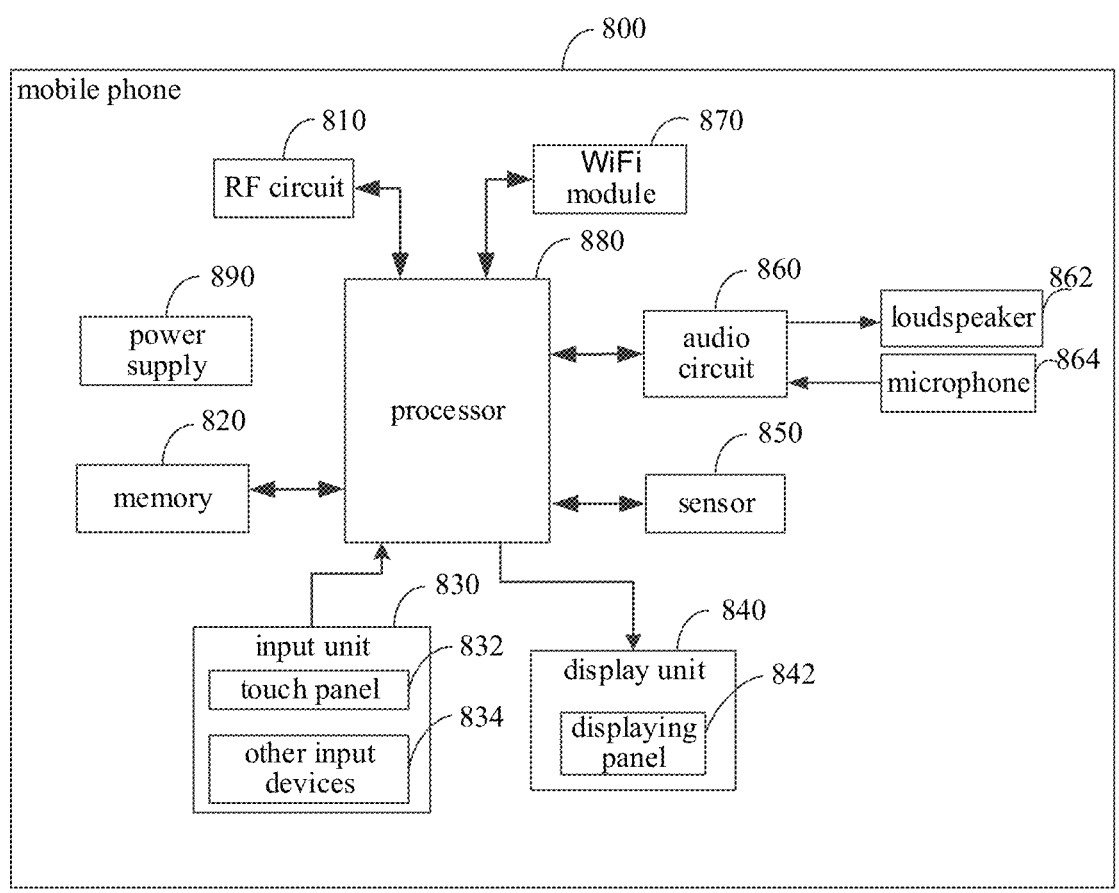
FIG. 8 is a block diagram of an electronic device according to another embodiment of the present disclosure.

Embodiments of the present disclosure also provide an electronic device. As illustrated in FIG. 8, for the convenience of description, only parts related to the embodiments of the present disclosure are illustrated. Details that are not disclosed may refer to the method embodiments of the present disclosure. The electronic device may be any terminal device including a mobile phone, a tablet computer, a PDA (personal digital assistant), a point of sales (POS), a car computer, a wearable device and the like. The electronic device being a mobile phone is taken as an example.

FIG. 8 is a block diagram illustrating a partial structure of a mobile phone related to an electronic device provided by an embodiment of the present disclosure. As illustrated FIG. 8, the mobile phone includes: a radio frequency (RF) circuit 810, a memory 820, an input unit 830, a display unit 840, a sensor 850, an audio circuit 860, a wireless fidelity (Wi-Fi) module 870, processor 880, a power supply 890 and other components. It will be understood by those skilled in the art that the structure of the mobile phone illustrated in FIG. 8 does not constitute a limitation to the mobile phone, and may include more or less components than those illustrated, or some components may be combined, or the components may be arranged differently.

The RF circuit 810 may be configured to receive and send information or receive and send signals during calling. After downlink information of a station is received, the downlink information is processed by the processor 880. Further, uplink data is sent to the station. Generally, RF circuit 810 includes, but is not limited to, an antenna, at least one amplifier, a transceiver, a coupler, a low noise amplifier (LNA), a duplexer, and the like. In addition, the RF circuitry 810 may also communicate with the network and other devices via wireless communication. The above wireless communication may use any communication standard or protocol, including but not limited to global system of mobile communication (GSM), general packet radio service (GPRS), code division multiple access (CDMA), wide band code division multiple access (WCDMA), Long Term Evolution (LTE), e-mail, short messaging service (SMS), and the like.

The memory 820 may be configured to store software programs and modules, and the processor 880 executes various functional applications and data processing of the mobile phone by running software programs and modules stored in the memory 820. The memory 820 may mainly include a program storage area and a data storage area, in which the program storage area may store an operating system, an application program (for example, audio play function, video play function) required by at least one function and the like. The data storage area may store data (for example, audio data, telephone book) created according to usage of the mobile phone, and the like. Moreover, the memory 820 may include a high speed random access memory, and may also include a non-volatile memory, such as at least one magnetic disk storage device, flash memory device, or other volatile solid state storage device.

The input unit 830 may be configured to receive inputted numeric or character information and to generate key signal inputs related to user settings and function controls of the mobile phone 800. Specifically, the input unit 830 may include a touch panel 832 and other input devices 834. The touch panel 832, also called as touch screen, may collect touch operations of the user performed thereon (for example, the user uses the finger, a pen or other suitable item or accessory to perform operations on the touch panel 832 or near the touch panel 832) and drive corresponding connected device according to predetermined procedure. In an embodiment, the touch panel 832 may include a touch detection device and a touch controller. The touch detection device may detect direction and position of a touch operation, detect signal caused by the touch operation and send the signal to the touch controller. The touch controller may receive touch information from the touch detection device and transform the touch information to coordinates of touch points and send the coordinates to the processor 880. Further the touch controller can receive commands sent from the processor 880 and execute the commands. Further, the touch panel 832 can be implemented as resistive, capacitive, infrared ray or surface acoustic wave (SAW) form. Besides the touch panel 832, the input unit 830 may further include other input devices 834. Specifically, other input devices 834 may include, but are not limited to, one or more of a physical keyboard, a function key (such as a volume control button, a switch button, etc.), and the like.

The display unit 840 may be configured to display information input by the user or information provided for the user, and various menus of the mobile phone. The display unit 840 may include a displaying panel 842. In an embodiment, the displaying panel 842 may be configured by using a liquid crystal display (LCD), an organic light-emitting diode (OLED), or the like. In an embodiment, the touch panel 832 may cover the displaying panel 842. When the touch panel 832 detects a touch operation on the touch panel or near the touch panel, the touch operation is sent to the processor 880 to determine the type of touch event. The processor 880 provides corresponding visual output on the displaying panel 842 according to the type of the touch event. In FIG. 8, although the touch panel 832 and the displaying panel 842 may be used as two separate components to realize the input and output function of the mobile phone, in some embodiments, the touch panel 832 and the displaying panel 842 may be integrated to realize the input and playing function of the mobile phone.

The mobile phone 800 may further include at least one sensor 850, such as an optical sensor, a motion sensor and other sensors. Specifically, the optical sensor may include an ambient light sensor and a proximity sensor. The ambient light sensor can adjust luminance of the displaying panel 842 according to brightness of the ambient light. The proximity sensor may switch off the displaying panel 842 and/or backlight when the mobile phone is moved to the ear. As one type of motion sensor, an acceleration sensor may detect acceleration values in various directions, may detect magnitude and a direction of the gravity when the mobile phone is static, and may be applied to an application that recognizes the attitude of the mobile phone (for example, landscape/portrait screen), a function related to vibration recognition (such as a pedometer and a knocking), and the like. In addition, the mobile phone can be configured with other sensors, such as a gyroscope, a barometer, a hygrometer, a thermometer, and an infrared sensor, which are not further described herein.

The audio circuit 860, a loudspeaker 862, and a microphone 864 may provide audio interfaces between the user and the mobile phone. The audio circuit 860 may convert received audio data into an electrical signal and transmit the electrical signal to the loudspeaker 862. The loudspeaker 862 converts the electrical signal into a sound signal for outputting. On the other hand, the microphone 864 converts a collected sound signal into an electrical signal. The audio circuit 860 receives the electrical signal and converts the electrical signal into audio data, and outputs the audio data to the processor 880 for processing. Then, the processor 880 sends the audio data to, for example, another mobile terminal by using the RF circuit 810, or outputs the audio data to the memory 820 for further processing.

Wi-Fi is a short distance wireless transmission technology. The mobile phone may help, by using the Wi-Fi module 870, the user to receive and send e-mails, browse a webpage, access streaming media, and so on. The Wi-Fi module 870 provides wireless broadband Internet access for the user. Although the Wi-Fi module 870 is illustrated in FIG. 8, it can be understood that, the Wi-Fi module 870 is not essential for the mobile phone 800, and may be omitted when required as long as the scope of the essence of the present disclosure is not changed.

The processor 880 is a control center of the mobile phone, which can use various interfaces and wires to couple respective parts of the mobile phone, and perform various functions and processing data of the mobile phone by running or executing software programs and/or modules stored in the memory 820 and calling data stored in the memory 820, so as to monitor the mobile phone overall. In an embodiment, the processor 880 may include one or more processing units. In an embodiment, the processor 880 may integrate an application processor and a modem processor, in which the application processor is mainly configured to process the operating system, the user interface and applications, and the modem processor is mainly configured to process wireless communication. It could be understood that the above-described modem processor may be not integrated in the processor 880. For example, the processor 880 may integrate the application processor and a baseband processor. The baseband processor and other peripheral chips may form the modem processor. The mobile phone 800 further includes the power supply 890 (such as a battery) for supplying power to the components. In an embodiment, the power supply may be logically coupled with the processor 880 by using a power management system, thereby implementing functions such as charging, discharging and power consumption management by using the power management system.

In an embodiment, the mobile phone 800 may further include a camera, a Bluetooth module and the like, which are not described herein.

In the embodiment of the present disclosure, the processor 880 included in the electronic device may implement the aforementioned data processing method when executing the computer programs stored on the memory.

In an embodiment, the electronic device may include a memory 820 and a processor 880. The memory 820 stores the computer programs. When the computer programs are executed by the processor 880, the processor 880 is caused to perform following operations: acquiring first image data of images stored in the local device and second image data of images stored in another device; comparing the first image data with the second image data to determine a storage type of each an image contained in the first image data and/or contained in the second image data, the storage type including at least one of: both storing in the local device and storing in the another device, only storing in the local device, and only storing in the another device; establishing a mapping relation between a first face group contained in the first image data and a second face group contained in the second image data according to the storage type; and processing the first image data and the second image data for the first face group and the second face group having the mapping relation with each other.

In an embodiment, a computer-readable storage medium is provided, having computer programs stored thereon. When the computer programs are executed by a processor, the processor is caused to implement the aforementioned data processing method.

In an embodiment, a computer program product containing computer programs is provided. When the computer program product is executed on a computer device, the computer device is caused to implement the aforementioned data processing method.

It should be understood that all or a part of the method provided by the present disclosure may be realized by programs instructing relative hardware, the programs may be stored in a computer-readable memory. When the programs are executed, the flow processes according to the above method embodiments can be implemented. The memory may include a magnet disk, an optical disk, an ROM, and the like.

Any reference to the memory, the storage, the database, or any other medium as used herein may include a non-volatile memory and/or a volatile memory. The suitable non-volatile memory may include a ROM, a programmable ROM (PROM), an electrically programmable (EPROM), an electrically erasable programmable ROM (EEPROM) and a flash memory. The volatile memory may include a RAM, which is used as an external cache. As illustration and without limitation, RAM may be implemented in may forms, such as static RAM (SRAM), dynamic RAM (DRAM), synchronic DRAM (SDRAM), double data rate SDRAM (DDR SDRAM), enhanced SDRAM (ESDRAM), synchlink DRAM (SLDRAM), memory bus (Rambus), direct RAM (RDRAM), direct memory bus dynamic RAM (DRDRAM), and memory bus dynamic RAM (RDRAM).

The various technical features in the above embodiments can be combined arbitrarily. For ease of description, not all possible combinations of the various technical features in the above embodiments are described. However, as long as the technical features are not inconsistent with each other, the combination of the technical features shall fall within the protection scope of the present disclosure.

Above embodiments merely illustrate some implementations of the present disclosure, which are described specifically and in detail, but do not constitute limitation to the scope of the present disclosure. It is to be noted that, those skilled in the art may make several modification and change without departing from the concept of the present disclosure, and these modification and change belong to the protection scope of the present disclosure. Thus, the protection scope of the present disclosure is defined by appending claims.

What is claimed is:

1. A data processing method, comprising:
   acquiring first image data of images stored in a local device and second image data of images stored in another device;
   comparing the first image data with the second image data to determine a storage type of an image contained in the first image data and/or contained in the second image data, the storage type comprising at least one of: both storing in the local device and storing in the another device, only storing in the local device, and only storing in the another device;
   establishing a mapping relation between a first face group contained in the first image data and a second face group contained in the second image data according to the storage type; and
   processing the first image data and the second image data with regard to the first face group and the second face group having the mapping relation with each other, wherein the first image data contains first face data of an image stored in the local device and the first face group corresponding to a face contained in the first face data, the second image data contains second face data of an image stored in the another device and the second face group corresponding to a face contained in the second face data;
   establishing the mapping relation between the first face group contained in the first image data and the second face group contained in the second image data according to the storage type comprises:
   when the image has the storage type of both storing in the local device and storing in the another device, matching the first face data of the image with the second face data of the image; and
   when the first face data of the image and the second face data of the image contain a same face, mapping a second face group corresponding to the same face to a first face group corresponding to the same face.

2. The method according to claim 1, wherein mapping the second face group corresponding to the same face to the first face group corresponding to the same face comprises:
   detecting whether the first face group corresponding to the same face has a mapping relation; and
   in response to detecting that the first face group corresponding to the same face has no mapping relation, establishing a mapping relation between the first face group corresponding to the same face and the second face group corresponding to the same face.

3. The method according to claim 2, further comprising:
   in response to detecting that the first face group corresponding to the same face has the mapping relation, determining whether a second face group having the mapping relation with the first face group corresponding to the same face is consistent with the second face group corresponding to the same face; and
   when the second face group having the mapping relation with the first face group corresponding to the same face is consistent with the second face group corresponding to the same face, maintaining the mapping relation.

4. The method according to claim 3, further comprising:
   when the second face group having the mapping relation with the first face group corresponding to the same face is inconsistent with the second face group corresponding to the same face, creating a new face group in the local device; and
   establishing a mapping relation between the second face group corresponding to the same face and the new face group.

5. The method according to claim 1, wherein the method further comprises:
   when the second face data of the image contains a face not matching any face contained in the first face data of the image, determining whether a second face group corresponding to the face not matching any face contained in the first face data has a mapping relation;
   when the second face group corresponding to the face not matching any face contained in the first face data has the mapping relation, maintaining the mapping relation; and
   when the second face group corresponding to the face not matching any face contained in the first face data has no mapping relation, creating a new face group in the local device and establishing a mapping relation between the second face group corresponding to the face not matching any face contained in the first face data and the new face group.

6. The method according to claim 1, wherein the method further comprises:
   when the first face data of the image contains a face not matching any face contained in the second face data of the image, reserving a first face group corresponding to the face not matching any face contained in the second face data.

7. The method according to claim 1, wherein establishing the mapping relation between the first face group contained in the first image data and the second face group contained in the second image data according to the storage type comprises:
when the image has the storage type of only storing in the another device, determining whether a second face group corresponding to a face contained in second face data of the image has a mapping relation; and
when the second face group corresponding to the face contained in the second face data of the image has the mapping relation, maintaining the mapping relation; and
when the second face group corresponding to the face contained in the second face data of the image has no mapping relation, creating a new face group in the local device and establishing a mapping relation between the second face group corresponding to the face contained in the second face data of the image and the new face group.

8. The method according to claim 1, wherein establishing the mapping relation between the first face group contained in the first image data and the second face group contained in the second image data according to the storage type comprises:
when the image has the storage type of only storing in the local device, reserving a first face group corresponding to a face contained in first face data of the image.

9. The method according to claim 1, wherein comparing the first image data with the second image data to determine the storage type of the image contained in the first image data comprises:
comparing a first storage path of the image contained in the first image data with each second storage path contained in the second image data;
when a second storage path is identical to the first storage path, determining the storage type of the image as both storing in the local device and storing in the another device; and
when no second storage path is identical to the first storage path, determining the storage type of the image as only storing in the local device.

10. The method according to claim 1, wherein comparing the first image data with the second image data to determine the storage type of the image contained in the second image data comprises:
comparing each storage path contained in the first image data with a second storage path of the image contained in the second image data;
when a first storage path is identical to the second storage path, determining the storage type of the image as both storing in the local device and storing in the another device; and
when no first storage path is identical to the second storage path, determining the storage type of the image as only storing in the another device.

11. The method according to claim 1, wherein comparing the first image data with the second image data to determine the storage type of the image contained in the first image data comprises:
comparing a first message digest of the image contained in the first image data with each second message digest contained in the second image data;
when a second message digest is identical to the first message digest and, determining the storage type of the image as both storing in the local device and storing in the another device; and
when no second message digest is identical to the first message digest, determining the storage type of the image as only storing in the local device.

12. The method according to claim 1, wherein comparing the first image data with the second image data to determine the storage type of the image contained in the second image data comprises:
comparing a second message digest of the image contained in the second image data with each first message digest contained in the first image data;
when a first message digest is identical to the second message digest and, determining the storage type of the image as both storing in the local device and storing in the another device; and
when no first message digest is identical to the second message digest, determining the storage type of the image as only storing in the another device.

13. An electronic device, comprising a memory and a processor, wherein the memory is configured to store computer programs that, when executed by the processor, cause the processor to implement a method, comprising:
acquiring first image data of images stored in a local device and second image data of images stored in another device;
comparing the first image data with the second image data to determine a storage type of an image contained in the first image data and/or contained in the second image data, the storage type comprising at least one of: both storing in the local device and storing in the another device, only storing in the local device, and only storing in the another device;
establishing a mapping relation between a first face group contained in the first image data and a second face group contained in the second image data according to the storage type; and
processing the first image data and the second image data with regard to the first face group and the second face group having the mapping relation with each other, wherein the first image data contains first face data of an image stored in the local device and the first face group corresponding to a face contained in the first face data, the second image data contains second face data of an image stored in the another device and the second face group corresponding to a face contained in the second face data;
establishing the mapping relation between the first face group contained in the first image data and the second face group contained in the second image data according to the storage type comprises:
when the image has the storage type of both storing in the local device and storing in the another device, matching the first face data of the image with the second face data of the image; and
when the first face data of the image and the second face data of the image contain a same face, mapping a second face group corresponding to the same face to a first face group corresponding to the same face.

14. The electronic device according to claim 13, wherein mapping the second face group corresponding to the same face to the first face group corresponding to the same face comprises:
detecting whether the first face group corresponding to the same face has a mapping relation; and in response to detecting that the first face group corresponding to the same face has no mapping relation, establishing a mapping relation between the first face group corresponding to the same face and the second face group corresponding to the same face.

15. The electronic device according to claim 14, wherein the method further comprises:
in response to detecting that the first face group corresponding to the same face has the mapping relation, determining whether a second face group having the mapping relation with the first face group corresponding to the same face is consistent with the second face group corresponding to the same face; and
when the second face group having the mapping relation with the first face group corresponding to the same face is consistent with the second face group corresponding to the same face, maintaining the mapping relation.

16. The electronic device according to claim 15, wherein the method further comprises:
when the second face group having the mapping relation with the first face group corresponding to the same face is inconsistent with the second face group corresponding to the same face, creating a new face group in the local device; and
establishing a mapping relation between the second face group corresponding to the same face and the new face group.

17. The electronic device according to claim 13, wherein the method further comprises:
when the second face data of the image contains a face not matching any face contained in the first face data of the image, determining whether a second face group corresponding to the face not matching any face contained in the first face data has a mapping relation;
when the second face group corresponding to the face not matching any face contained in the first face data has the mapping relation, maintaining the mapping relation; and
when the second face group corresponding to the face not matching any face contained in the first face data has no mapping relation, creating a new face group in the local device and establishing a mapping relation between the second face group corresponding to the face not matching any face contained in the first face data and the new face group.

18. A non-transitory computer-readable storage medium, stored with computer programs that, when executed by a processor, cause the processor to implement a method, comprising:
acquiring first image data of images stored in a local device and second image data of images stored in another device;
comparing the first image data with the second image data to determine a storage type of an image contained in the first image data and/or contained in the second image data, the storage type comprising at least one of: both storing in the local device and storing in the another device, only storing in the local device, and only storing in the another device;
establishing a mapping relation between a first face group contained in the first image data and a second face group contained in the second image data according to the storage type; and
processing the first image data and the second image data with regard to the first face group and the second face group having the mapping relation with each other,
wherein the first image data contains first face data of an image stored in the local device and the first face group corresponding to a face contained in the first face data, the second image data contains second face data of an image stored in the another device and the second face group corresponding to a face contained in the second face data;
establishing the mapping relation between the first face group contained in the first image data and the second face group contained in the second image data according to the storage type comprises:
when the image has the storage type of both storing in the local device and storing in the another device, matching the first face data of the image with the second face data of the image; and
when the first face data of the image and the second face data of the image contain a same face, mapping a second face group corresponding to the same face to a first face group corresponding to the same face.

* * * * *